United States Patent
Aquilon et al.

(10) Patent No.: US 6,738,800 B1
(45) Date of Patent: May 18, 2004

(54) METHOD AND APPARATUS FOR ORGANIZING AND ACCESSING ELECTRONIC MESSAGES IN A TELECOMMUNICATIONS SYSTEM

(75) Inventors: Adam Aquilon, Järfälla (SE); Stefan Willehadson, Uppsala (SE); Jan Gabrielsson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 668 days.

(21) Appl. No.: 09/604,841

(22) Filed: Jun. 27, 2000

(30) Foreign Application Priority Data

Jun. 28, 1999 (SE) ............................................. 9902462

(51) Int. Cl.⁷ ............................................. G06F 13/00
(52) U.S. Cl. ...................... 709/206; 709/203; 709/217; 709/219
(58) Field of Search .............................. 709/200, 201, 709/203, 206, 217, 218, 219, 213, 216, 227

(56) References Cited

U.S. PATENT DOCUMENTS

| | | | | |
|---|---|---|---|---|
| 5,765,178 A | * | 6/1998 | Tanaka | 707/526 |
| 5,793,970 A | | 8/1998 | Fakes et al. | 709/246 |
| 5,859,898 A | * | 1/1999 | Checco | 379/88.01 |
| 5,890,163 A | * | 3/1999 | Todd | 707/200 |
| 5,911,776 A | * | 6/1999 | Guck | 709/217 |
| 6,275,848 B1 | * | 8/2001 | Arnold | 709/206 |

FOREIGN PATENT DOCUMENTS

| | | |
|---|---|---|
| EP | 0 886 227 A1 | 12/1998 |
| WO | WO 96/34341 | 10/1996 |
| WO | WO 98/19438 | 5/1998 |

OTHER PUBLICATIONS

Vandevenne, M.; EPO Standard Search Report No. RS 103384 SE, re: Swedish App. No. 9902462, Feb. 24, 2000, pp. 1–3.

Dalianis, H., et al., "Aggregation in Natural Language Generation," 1996, in Adorni, G. & Zock, M. (Eds.), *Trends in Natural Language Generation: an Artificial Intelligence Perspecti* EWNLG 93, Fourth European Workshop, Lecture Notes in Artifical Intelligence, No. 1036 pp. 88–105, Springer Verlag.

* cited by examiner

Primary Examiner—Moustafa M. Meky

(57) ABSTRACT

The invention relates to the organization of electronic messages (101) coming in to a user who can access his/her messages via at least two different types of access environments (130–165). A first storage area (100) receives the electronic messages (101), which each has an original data format. The electronic messages (101) are then stored according to a first structure (102). An agent (110) processes the electronic messages (101) into at least one set of processed electronic messages (113a–113c) having data formats, which are at least as adapted to an alternative access environment as the data formats of the corresponding original electronic messages. The processed electronic messages (113a–113c) are then stored according to at least one second structure (121a–121c) that is a mapping of the first structure (102). The user may either access an original electronic message (101) in the first structure (102) or one of the processed electronic messages (113a–113c) in the at least one second structure (121a–121c). The choice of message version is based on the type of access environment (130–165) that the user currently has at his/her disposal.

22 Claims, 3 Drawing Sheets

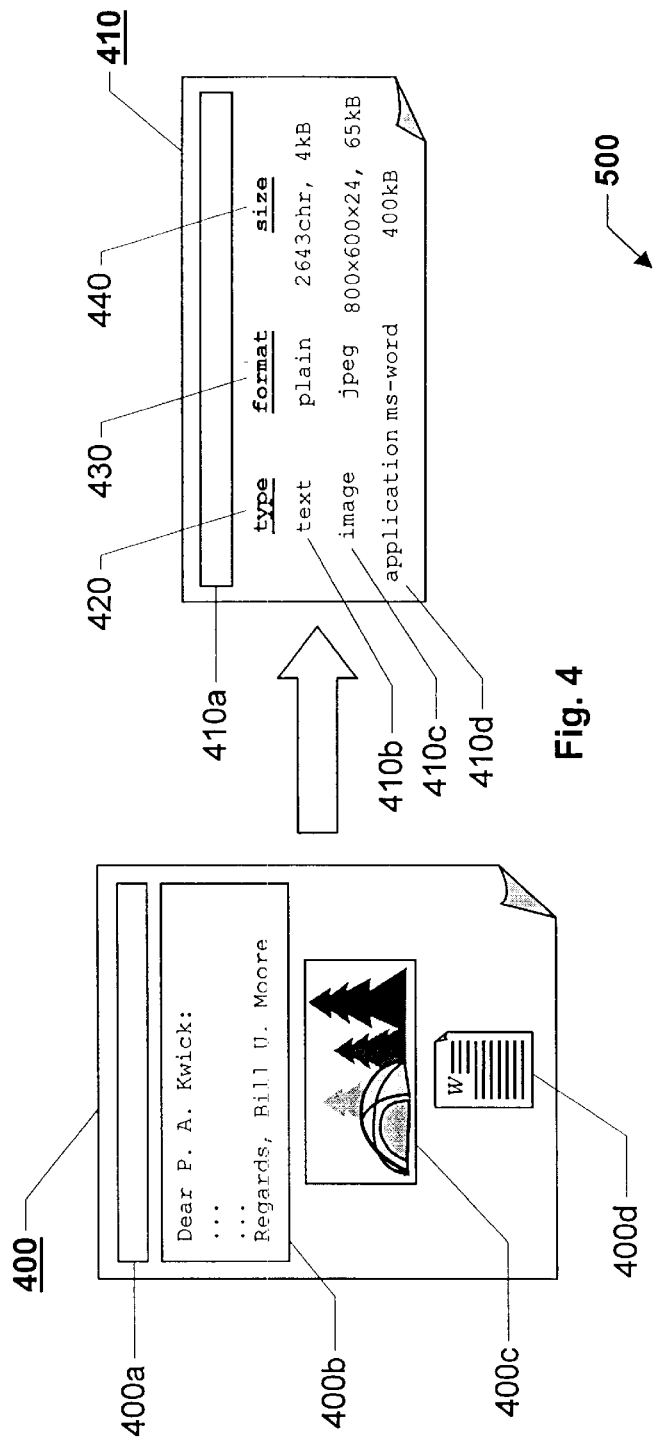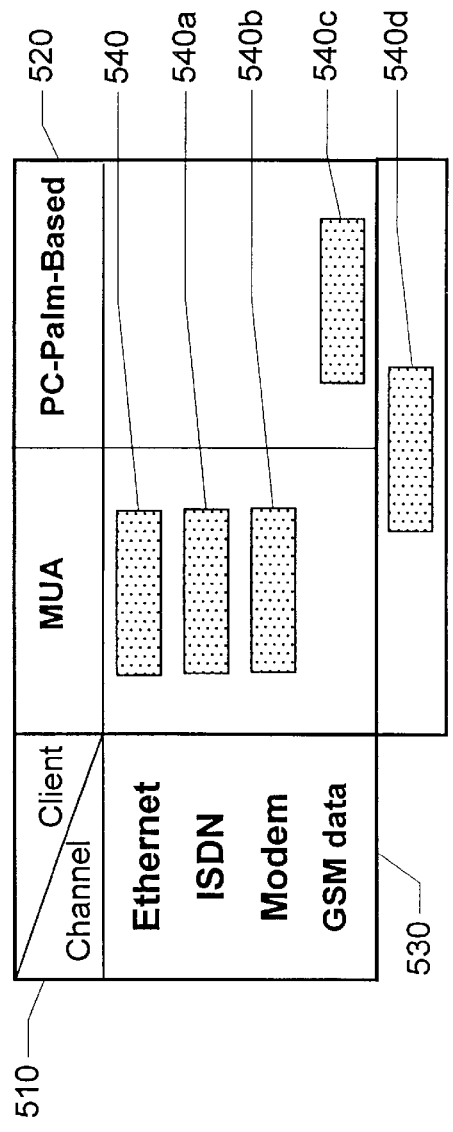

METHOD AND APPARATUS FOR ORGANIZING AND ACCESSING ELECTRONIC MESSAGES IN A TELECOMMUNICATIONS SYSTEM

The present invention relates generally to electronic messaging. More particularly the invention relates to a method of organizing incoming electronic messages to a user who can access his/her messages via at least two different types of access environments. The invention also relates to an apparatus for carrying out the proposed method.

BACKGROUND

The rapid growth of distributed computer systems in recent years has significantly increased the communication of electronic messages. The most typical example of this prevalent form of asynchronous communication is the vast amount of electronic mails (e-mails) being exchanged across the Internet. These e-mails may contain a wide variety of information formats, such as text, audio, still images and video. In general, an e-mail including one or more components of the latter three formats becomes relatively large in comparison with an e-mail containing text only.

Moreover, the large number of mobile terminals, like cellular telephones, smart phones, WAP phones (WAP= Wireless Application Protocol) and laptops in today's communication networks have increased the demand for mobile e-mail access as well as access to an e-mail service, which can be reached from various types of access environments. In some of these environments the communication channel, the e-mail client, or both, place comparatively severe limitations on the amounts of information that realistically can be communicated with the user. The limitations may be anything from experienced user comfort (accessing large e-mails over a low bandwidth network namely tends to be very tedious) to purely technical limitations (since some terminals plainly cannot present certain parts of an e-mail due to e.g. their limited display capabilities). Furthermore, a limited-bandwidth channel often means that the client communicating over the channel is relatively simple, and simple e-mail clients are sometimes completely unable to present certain kinds of information formats. Either they lack the required processing capacity or they are not equipped with appropriate display means.

It may thus be interesting for a user to be able to alleviate the problems resulting from the above-mentioned limitations.

The patent document U.S. Pat. No. 5,793,970 discloses an electronic mail system including a local computer, which can be connected to a message server over a data link. A user may hence order the system to create an off-line store on his/her local computer such that folders and messages may be manipulated in the same way that the user normally can manipulate the folders and the messages in the mailbox on the message server. Large identification codes in the message server are converted into shorter and more space-efficient identification codes, which are optimised for the local computer format. In effect, each message is consequently compacted to some extent. The actual payload information in messages is nevertheless not compressed.

The mail system according to U.S. Pat. No. 5,793,970 avoids some of the problems that occur when accessing e-mails over narrow-bandwidth channels, or even in access environments which completely lack a communication channel. However, once the off-line store has been created real time access to the e-mails is ruled out. When checking for fresh e-mails the user therefore must re-connect to the message server and order an updated version of the off-line store. A narrow-bandwidth channel or a non-existing channel, of course, make this problematic respective impossible.

The European patent document EP, A1, 0 886 227 describes an apparatus for accessing electronic mail messages by means of queries composed on client computers. The queries placed by a user search a full-text index to locate those of the user's mail messages that satisfy the queries. The system also heuristically locates text strings that have the syntax of an URL (Universal Resource Locator) and makes the string a hot-link, which will retrieve the related contents over the network whenever activated. Furthermore, explicitly attached files and implicitly embedded files are located and displayed by a suitable browser. In case a user accesses the mail service via a low bandwidth network connection, an attempt is made to minimise the amount of data that are sent from the mail service system to the client computer. This is effectuated by replacing explicitly attached and implicitly embedded files by corresponding hot-links. The generation of such hot-links, however, requires a customised mail server particularly designed for accomplishing this feature.

The international application WO98/19438 relates to a messaging system for receiving, storing and originating multimedia messages. An incoming message is here stored in a database in its original format. Before the message is delivered to a user it is automatically translated into a format, which is adapted to the presentation capabilities of the user's current terminal and the access network via which this terminal communicates with the messaging system. The automatic translation of messages, naturally, demands a particular translation unit within the system.

Consequently, the existing solutions for handling electronic messages over limited-bandwidth channels all demand customised servers and/or protocols for accomplishing the electronic messaging service. Some of the known methods further require the user clients to be especially modified in order to function correctly when accessing compressed messages.

SUMMARY OF INVENTION

It is therefore an object of the present invention to eliminate the above-indicated problems being associated with the known art.

It is a further object of the invention to decrease the communication of redundant information over a communications network and thereby increase the efficiency of the same.

Moreover, it is an object of the present invention to provide a user of an electronic messaging service with a perspicuous survey of his/her electronic messages in different types of access environments.

The invention solves these problems by receiving electronic messages, which each has an original data format. The electronic messages are then stored according to a first structure. Each message is processed into at least one processed electronic message. The processed electronic message has a data format, which is at least as adapted to an alternative access environment as the original data format, and the message is stored in a structure that is a mapping of the first structure. Finally, the user either accesses the original electronic message or one of the processed electronic messages. The choice of message version is based on the type of access environment that the user currently has at his/her disposal.

A method of organising incoming electronic messages according to the invention is hereby characterized by the features of the an aspect of the presently claimed invention.

An apparatus according to the invention includes a first storage area for storing electronic messages. The messages are here arranged according to a first structure and each message is presumed to have an original data format. The apparatus also includes an agent for processing the electronic messages into at least one set of processed electronic messages. Each of the processed electronic messages has a derivative data format, which is at least as adapted to an alternative access environment as the original data format of the corresponding electronic message. A second storage area is likewise included in the apparatus. This storage area stores the processed electronic messages according to a respective second structure, which is each, a mapping of the first structure.

An apparatus for accessing and sending electronic messages according to the invention is hereby characterized by the features of another aspect of the present claimed invention.

An advantage of the invention is that it makes it possible for a user to conveniently access corporate e-mail messages also on clients that have insufficient capacity for accessing these messages in their original format.

Another advantage of the invention is that standard protocols and unmodified servers and clients can be used to accomplish the service.

The invention is transparent to security schemes, for instance certificate-based and channel-based, which results in the advantageous effect of maintained security irrespective of access environment.

Yet an advantage of the invention is that it allows more than one simultaneous user access to a specific electronic message as well as to one or more of its processed counterparts.

BRIEF DESCRIPTION OF TEE DRAWINGS

FIG. 4 presents an example over how a processed electronic message is converted into a meta-message according to the invention; and FIG. 5 illustrates how a user can choose to access electronic messages and processed electronic messages according to the invention in various access environments.

The invention will now be described in more detail with reference to preferred exemplifying embodiments thereof and also with reference to the accompanying drawings.

DESCRIPTION OF PREFERRED EMBODIMENTS

Figure 1:
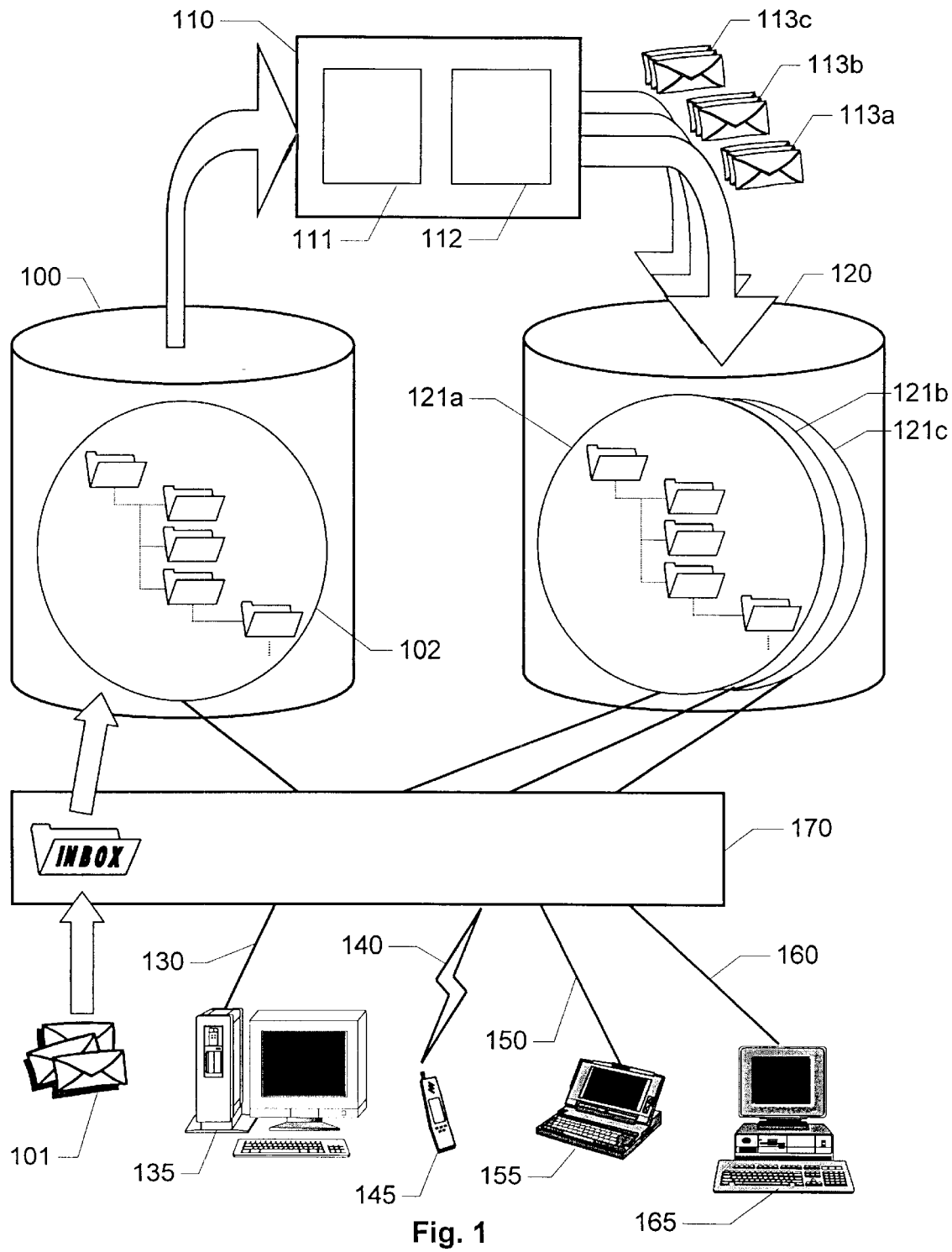
FIG. 1 shows an apparatus according to the invention.

An apparatus according to the invention is shown in FIG. 1. The apparatus contains a first storage area 100, an agent 110, a second storage area 120, various kinds of access environments 130–165 for accessing and sending electronic messages and a means 170 for interfacing with the access environments 130–165.

Incoming electronic messages 101 to a particular user enter the apparatus via the interfacing means 170, which typically is an e-mail server. In the general case, however, the interfacing means 170 can be any combination of soft- and hardware suitable for administrating the electronic messages in question. Primarily, the incoming electronic messages 101 are stored in a root inbox. The messages 101 are then transferred or copied to the first storage area 100, where they are arranged according to a first structure 102 being defined by the user.

The agent 110 reads the messages 101 into an analysing means 111, which determines the constituents of each message, i.e. what components the message contains and the various data formats that these components have. Plain text is one example of such a message component. Color and font size constitute other format examples. The message components may also be pictures, video sequences or voice messages. These can have many different formats, of which jpeg, mpeg and wav represent one example of each respective format.

On basis of the components in the message a processing means 112 in the agent 110 processes the electronic message 101 into a corresponding first processed electronic message 113a having a data format which is at least as adapted to an alternative access environment as the original data format. Sometimes, this alternative environment involves a less capable client and/or channel, which requires a more space-efficient data format to be useful for presentation. However, the contrary may also be true, namely that the alternative environment requires a data format, which is less space-efficient than the data format of the original message 101. If, for instance, the user client only is capable of presenting acoustical information and the user desires to access a text message, a converted voice message constitutes a more adapted message format than the original format. Such a format generally requires more space than a corresponding text message.

The processing can be one of two principally different kinds, namely "filtering" or "thinning".

The term "filtering" here means transforming the message, however not eliminating any of its actual contents. Downscaling, subsampling or image coding of a picture included in or attached to the electronic message are thus some alternative ways of filtering the message. Another example of filtering would be to convert a voice message included in or attached to the electronic message into a corresponding text message. A further example of filtering would be to semantically analyse a text message and transform it into a more condensed text message, which still has the same meaning as the original text message. This can, for instance, be performed according to the principles laid out in H. Dalianis and E. Rovy. 1996, "Aggregation in Natural Language Generation, In Adorni, G. & Zock, M. (Eds.), Trends in Natural Language Generation: an Artificial Intelligence Perspective", EWNLG'93, Fourth European Workshop, Lecture Notes in Artificial Intelligence, No. 1036, pp. 88–105, Springer Verlag.

The term "thinning" shall be understood as transforming an electronic message size by removing one or several components from the message. Typical candidates for such removal are colours, pictures and video clips. The most drastic kind of thinning is to remove the entire electronic message and replace it with an identifier. The identifier can include header information like title, sender data and time/date plus a description of the payload data in the electronic message, such as ASCII text (possibly along with an indication of the number of paragraphs and/or characters), image (possibly along with an indication of type and/or size) and application (possibly along with an indication of type and/or size).

Besides the first processed electronic message 113a one or more additional processed electronic messages 113b and 113c may be produced, which also have a data format which is at least as adapted to an alternative access environment as the data format of the original electronic message 101. These processed electronic messages 113b; 113c represent different forms of filtered or thinned versions of the original electronic message 101 than the first processed electronic message 113a. The agent 110 stores the sets of processed electronic messages 113a, 113b and 113c in the second storage area 120 in respective second structures 121a, 121b and 121c, which each is a mapping of the first structure 102. The user may thus find a certain electronic message either in its original form in the first structure 102 or as a processed electronic message 113a–113c in one of the second structures 121a–121c.

If the user has a comparatively powerful access environment at his/her disposal, e.g. a MUA (Mail User Agent) client on a workstation 135 communicating with the interfacing unit 170 over an Ethernet 130, the user can readily access any of the messages 101, 113a, 113b or 113c. However, if the user currently has a less capable access environment, like a PC-palm-based client on a mobile terminal 145 connected to the interfacing means 170 via a radio link 140, a MUA client on a laptop 155, which communicates over a modem link 150 or a MUA client on a desktop PC with an ISDN-connection to the interfacing means 170, the user should rather choose to access one of the processed electronic message 113a–113c. For each type of access environment 130–165 there is a message version 102, 113a, 113b or 113c which is optimal with respect to the bandwidth and capabilities of that particular access environment.

Figure 2:
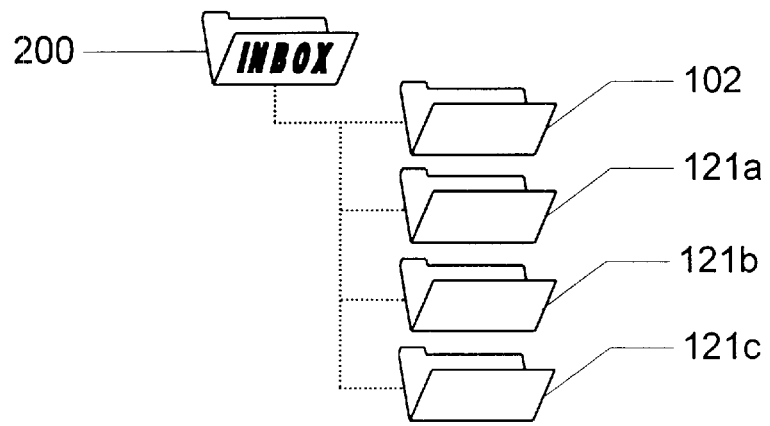
FIG. 2 depicts a folder structure containing electronic messages and processed electronic messages according to the invention.

FIG. 2 shows a folder structure containing the original electronic messages and the processed electronic messages described with reference to FIG. 1. A folder 102 holding the original electronic messages in a sub-structure and corresponding folders 121a, 121b; 121c holding the processed electronic messages in their respective sub-structures are organized directly under a root-level inbox 200. A user may thus readily gain access to an original electronic message or a desired processed version of the message simply by opening the corresponding folder 102 respective 121a, 121b or 121c and browse through its structure. The folders 102, 121a, 121b, and 121c all contain messages that are structured according similarly since the folders 121a, 121b, and 121c represent mappings of the same structure, namely the structure of the original, non-processed, electronic messages 102.

According to an alternative embodiment of the invention, the folders 121a, 121b, and 121c do not actually contain electronic messages that have been pre-processed, i.e. processed before the user has indicated that he/she desires to access a processed version of a particular message. Instead, the folders 121a, 121b, and 121c may represent the possibility of having an electronic message processed in a certain way. For instance, the folder 121a may represent filtering away any colour components, the folder 121b may correspond to having any voice components converted into text messages and the folder 121c may involve thinning any pictures to a mere picture reference. The actual processing does then not occur until the user opens one of the folders 121a–121c and indicates that he/she wants to access a message, which has been processed according to a specific rule, such as one of those described above.

In a preferred embodiment of the invention the folders are displayed graphically on a screen in the user terminal, principally as shown in FIG. 2. However, alternative hierarchies and non-graphical, e.g. acoustical, means of presenting the folders to the user are also both relevant and technically feasible. Naturally, any integer number of folders for the processed electronic messages is possible. However, it is generally not meaningful to have more such folders than the number of different types of access environments that the user has at his/her disposal. Besides the mentioned folders 121a–121c for the processed electronic messages, a so-called meta-folder containing only identification data for each electronic message can be present. The meta-folder will be described further when discussing FIGS. 4 and 5 below.

Figure 3:
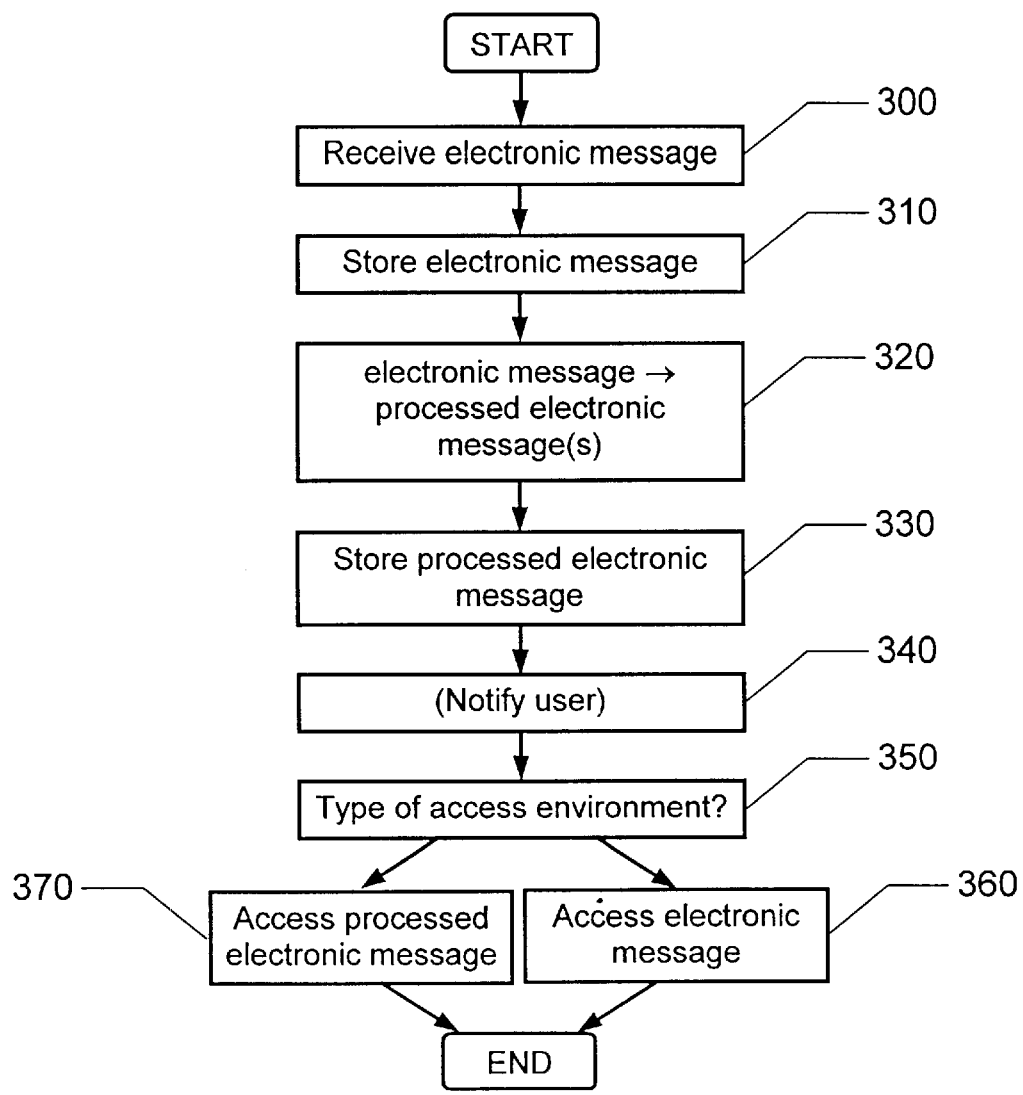
FIG. 3 shows a flow chart over the method according to the invention.

FIG. 3 shows a flow chart illustrating the general principle of the method according to the invention, which has already been touched upon in connection with FIG. 1 above.

A first step 300 receives an electronic message. A following step 310 stores the electronic message, typically on an e-mail server. However, any alternative electronic storage medium may be used for storing the message. A third step 320 processes the electronic message into at least one processed electronic message having a data format having a data format, which is at least as adapted to an alternative access environment as the data format of the electronic message received in the step 300. As previously mentioned, the processing may involve either "filtering" or "thinning" of the electronic message.

A subsequent step 330 stores the processed electronic message, typically on the same e-mail server as the original electronic message was stored on in the step 310. Of course, any alternative electronic storage medium may likewise be used for storing the processed electronic message.

A step 340 then follows, which according to a first preferred embodiment of the invention, is empty. According to a second preferred embodiment, the step 340 notifies the user being the recipient of the electronic message that the apparatus has received the message and that the user may access it. In a third preferred embodiment of the invention, the step 340 is instead executed after the step 300, possibly already before the step 310.

After the step 340, the user may wish to access the received electronic message either in its original format or in a format, which is a processed version of this format. In a following step 350, the user indicates in which of the said data formats that he/she prefers to have the message presented. This decision is primarily based upon the access environment that the user currently has at his/her disposal. In case a processed message already has been created, such a message may be presented as promptly the original message. Otherwise, the requested processing will be performed on-demand if the user decides to access a processed version of the electronic message. This, of course, causes some delay in the presentation of the message.

A step 360 is carried out as a result of the user choosing to access an electronic message in its original format, on one hand. On the other hand, a step 370 is performed if the user decides to access the message in a processed format. Under the second preferred embodiment of the invention, the step 370 also involves the processing step 320.

An exemplifying electronic message 400 is disclosed in FIG. 4. The figure illustrates how the electronic message 400 is converted into a processed electronic message 410 that has a considerably more space-efficient format. The processed electronic message 410 is here namely a so-called meta-folder that only contains references to the components, which were originally comprised in the electronic message 400.

The message 400 contains a header 400a, which includes general information, such as a title, a sender reference and a time/date field. The message 400 is also presumed to contain a text component 400b, an image 400c and an application 400d. It is irrelevant whether some, all or none of these components 400b–400d are actually included in the message body or if they are instead attached to the electronic message 400. The components 400b–400d are still processed in the same way. The manner in which the references are presented in the processed electronic message 410 may, however, differ to some extent.

The header 400a is ordinarily not so large and it contains comparatively important data. The header 410a is therefore not further condensed in the processed electronic message 410 according to preferred embodiments of the invention. Nevertheless, in other embodiments one or more of the header's fields may well be eliminated to save extra space. The electronic message's payload components 400b–400d are maximally "thinned" into mere references 410b–410d to their characteristics. In this example the parameters type 420, data format 430 and size 440 have been chosen. However, other parameters, such as language, may also be selected to characterise the components 400b–400d.

The text component 400b in the electronic message 400 thus corresponds to the first line 410b in the processed electronic message 410, which says type=text, format=plain and size=2643 characters, 4 kB. Correspondingly the image component 400c is represented by the second line 410c, stating that type=image, format×jpeg and size×800=600=24 bits, 65 kB, and the application 400d is represented by the third line 410d, stating that type=application, format=ms-word and size=400 kB.

The processed electronic message 410 can be regarded as a label collection that gives the user a rough idea of what the corresponding original electronic message 400 contains. Perhaps this information is sufficient at the time. If not, the user can choose to access a differently processed electronic message or the original electronic message itself.

FIG. 5 illustrates, in a matrix 500, how a user may choose to access electronic messages respective various kinds of processed electronic messages in relation to the different types of access environments 510 that the user has at his/her disposal. The FIG. 5 is primarily intended to show how the user's preferences can be pre-defined, i.e. that a particular form of processing is set as the default in a given access environment.

Hence, if the user is logged on to a system where he/she has a MUA client (e.g. a Netscape client) for accessing his/her electronic messages via an Ethernet connection 540, the messages will be presented to the user in their original format (i.e. from the structure 102 FIG. 1). When the same user instead accesses his/her electronic messages via an ISDN-connected MUA client, messages that have been processed in a first manner 540a are presented as the default alternative (i.e. from structure 121a in FIG. 1). A corresponding connection to the electronic messaging service over a modem link gives the user access to electronic messages that have been processed in a second manner 540b as the default alternative (i.e. from structure 121b in FIG. 1), whereas a connection to the electronic messaging service via PC-palm-based client and a GSM data connection presents to the user electronic messages that have been processed in a third manner 540c as the default alternative (i.e. from structure 121c in FIG. 1).

The matrix 500 may, nevertheless, also symbolize how folders containing differently processed electronic messages can be presented graphically to the user. Client type is indicated along the horizontal axis 520 in the FIG. 5 and access channel type is indicated along the vertical axis 530. A first folder containing the first structure 102 (in FIGS. 1 and 2) is opened by clicking a first symbol 540, when located in a first access environment, a second folder containing the second structure 121a (in FIGS. 1 and 2) is opened by clicking on a second symbol 540a representing a second access environment, and so on.

A fifth symbol 540d represents a so-called meta-folder, under which electronic messages having been maximally "thinned" as described with reference to FIG. 4, are stored. Thus, by clicking on this symbol 540d the user can browse through identification data pertaining to all his/her electronic messages.

The term "comprises/comprising" when used in this specification is taken to specify the presence of stated features, integers, steps or components. However, the term does not preclude the presence or addition of one or more additional features, integers, steps or components or groups thereof.

The invention being thus described, it will be obvious that the same may be varied in many ways. Such variations are not to be regarded as a departure from the scope of the invention, and all such modifications as would be obvious to one skilled in the art are intended to be included within the scope of the following claims.

What is claimed is:

1. A method for organizing incoming electronic messages to a user having at least two different types of access environments, said method comprising the steps of:
   receiving an electronic message having a plurality of components having different format types, wherein at least one of the plurality of components has an original data format type;
   storing the electronic message in accordance with a first structure;
   processing the electronic message into at least one processed electronic message having a data format type which is adapted to an alternative access environment as the original data format type, wherein the processing includes:
   identifying one or more message components in the electronic message and replacing at least one message component with corresponding identification data;
   thinning the at least one message component in accordance with a predefined rule to transform the at least one message component into a format type different from the original data format type;
   determining the format of the message component from data associated with the message component;
   storing the processed electronic message in accordance with a second structure which is a mapping of the first structure; and
   accessing, by said user, the electronic message or one of the at least one processed electronic messages depending on the type of access environment currently at the disposal of said user.

2. The method according to claim 1, wherein a color component is removed from the electronic message.

3. The method according to claim 1, wherein a picture included in or attached to the electronic message is downscaled, subsampled or image coded.

4. The method according to claim 1, wherein a voice message included in or attached to the electronic message is converted into a corresponding text message.

5. The method according to claim 1, wherein a text message is semantically analyzed and transformed into a more condensed text message.

6. The method according to claim 1, wherein the processing step removes at least one part of a component of the electronic message so as to thereby reduce the overall size of said message.

7. The method according to claim 6, wherein the entire electronic message is removed and replaced by one or more identifiers for the message.

8. The method according to claim 7, wherein the identifier comprises an indicator of a rule causing the particular electronic message to be removed.

9. The method according to claim 1, wherein the processing step identifies one or more message components in the electronic message and replaces each of the identified message components with corresponding identification data.

10. The method according to claim 9, wherein the identification data comprises a type reference, a format reference and/or a size reference.

11. An apparatus for accessing and sending electronic messages, said apparatus comprising:
- a first storage area for storing electronic messages, the electronic messages being arranged according to a first structure and each of the electronic messages having an original data format type;
- an agent for processing the electronic messages into at least one set of processed electronic messages, each processed electronic message having a data format type which is adapted to an alternative access environment as the original data format type, wherein the agent comprises instructions for:
  - identifying one or more message components in the electronic message and replacing at least one message component with corresponding identification data;
  - thinning the at least one message component in accordance with a predefined rule to transform the at least one message component into a type of format type different from the original data format type; and
- a second storage area for storing the processed electronic messages according to a second structure, said second structure being a mapping of the first structure.

12. The apparatus according to claim 11 further comprising a notifying means for notifying a recipient user that said electronic message has been received and stored in the first storage area, said electronic message is processed and stored in the second storage area.

13. The apparatus according to claim 11, further comprising an interfacing means for providing a user access to the stored electronic messages from at least two different types of access environments.

14. The apparatus according to claim 13, further comprising a selecting means for selecting a particular stored electronic message or a particular stored processed electronic message in each of the at least two different types of access environments.

15. The apparatus according to claim 11, wherein the filtering means further comprises means for removing color components from the electronic message.

16. The apparatus according to claim 11, wherein the filtering means further comprises means for downscaling pictures included in or attached to the electronic message.

17. The apparatus according to claim 11, wherein the filtering means further comprises means for converting voice messages included in or attached to the electronic message into corresponding text messages.

18. The apparatus according to claim 11, wherein the filtering means further comprises means for semantically analyzing text messages in the electronic message and transforming the text messages into more condensed text messages.

19. The apparatus according to claim 11, wherein the agent further comprises means for removing at least one component from an electronic message stored in the first storage area so as to thereby reduce the overall size of said message.

20. The apparatus according to claim 11, wherein the agent further comprises means for identifying one or more message components in an electronic message stored in the first storage area and replacing each of the identified message components with corresponding identification data in a processed electronic message.

21. The apparatus according to claim 20, wherein the identification data comprises a type reference, a format reference and/or a size reference.

22. The apparatus of claim 20, further comprising means for arranging the processed electronic messages of the second structure under a meta-folder.

* * * * *